Aug. 8, 1944.  A. V. BEDFORD  2,355,136
CAMERA DEVICES
Filed Sept. 30, 1941
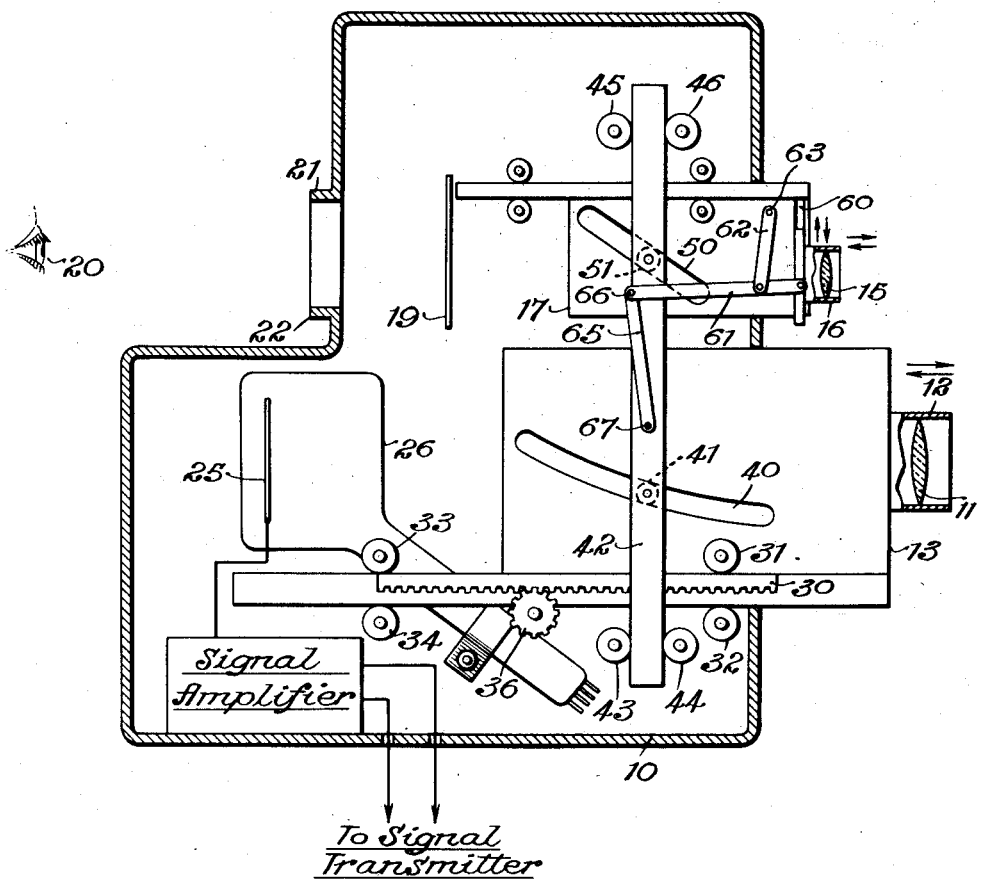
INVENTOR
Alda V. Bedford
BY
H. S. Snover
ATTORNEY Patented Aug. 8, 1944

2,355,136

UNITED STATES PATENT OFFICE 2,355,136

CAMERA DEVICE

Alda V. Bedford, Collingswood, N. J., assignor to Radio Corporation of America, a corporation of Delaware Application September 30, 1941, Serial No. 413,060

3 Claims. (Cl. 95—44)

My invention, in general, relates to camera apparatus, and more particularly to the view finding systems of such apparatus.

There is described and shown in United States Patent No. 2,162,908 dated June 20, 1939, a camera view finding arrangement in which the camera lens and the view finder lens are positioned substantially co-planarly. In focusing the camera the view finder lens and the camera lens are moved simultaneously and are maintained in a co-planar position. Also, the view finder screen and the light sensitive screen, which in that case is the photo-electric element of a television scanning tube, are positioned co-planarly and, accordingly, in the light of the foregoing it will be apparent that lenses of the same focal length must be used in conjunction with both the view finder and the camera. Accordingly, it is one of the objects of my invention to provide an apparatus in which the view finding and camera lenses must not necessarily be of the same focal length or mounted co-planarly.

It is desirous in particular arrangements of television cameras to have the view finding screen placed in a position which is not necessarily co-planar with the light sensitive screen of the camera, particularly in the case of television cameras. Accordingly, it is one of the objects of my invention to provide an arrangement in which the view finder screen of a camera need not be positioned co-planarly with respect to the sensitized screen in the camera.

Again, it will be appreciated that it may not always be desirable either to mount the view finder and the camera lens in the same member and positioned substantially co-planarly with respect to each other, nor may it necessarily be desirous to have the two of the same focal length. Accordingly, it is another of the objects of my invention to provide a camera arrangement in which the view finder lens and the camera lens may be mounted on separate members and the two lenses need not be of the same focal length.

Since the view finder lens system is mounted on a unit which is separate from the camera lens system, relative motion in two co-ordinates may be made possible, and accordingly the usual errors due to parallax may be reduced, and accordingly it is another of the objects of my invention to provide an arrangement for reducing parallax between the camera lens and the view finding lens in a camera.

Among the objects of my invention are:

1. To provide an apparatus in which the view finding and camera lenses must not necessarily be of the same focal length or mounted co-planarly.

2. To provide an arrangement in which the view finder screen of a camera need not be positioned co-planarly with respect to the sensitized screen in the camera.

3. To provide an arrangement for reducing parallax between the camera lens and the view finding lens in a camera.

My invention, in general, comprises providing, in a camera, view finding and camera, or light sensitive, screens which are not necessarily co-planarly related, and providing a lens arrangement for co-operating with each to project thereon and focus thereon an optical image. Lens mounts are provided for both the view finding and the camera lenses and these mounts are so arranged that movement of one causes a movement of the other to the extent that differences in focal length of the two lens systems are compensated. In addition, apparatus is provided whereby movement of the camera lens mount reduces the parallax effect between the two lens systems.

My invention will be understood best by reference to the single figure of the drawing, which shows one embodiment thereof.

Referring to the drawing, the casing of a television camera is indicated at 10 and the necessary operative portions of the mechanism are contained within this casing. A camera lens 11 is mounted within a lens holder or mount 12 which forms part of a movable housing or hood 13. A view finder lens 15 is mounted within a lens mount 16, the latter forming part of a housing or hood 17. The view finder lens is adapted to focus onto a ground glass or other viewing screen 19. An observer, whose eye is indicated conventionally at the point 20, may observe the image on the ground glass screen 19 through an eye viewing opening in the camera casing 10 having edges 21 and 22. It will be appreciated that since this is a schematic showing the arrangements for maintaining the camera casing substantially light tight in order to avoid exposing the sensitized medium which is used, or, in the case of a television arrangement, from flooding the photo-electric mosaic 25 of an "Iconoscope" tube 26 or other suitable image scanning arrangement, are not indicated since they do not per se form a part of this invention. Also, for the purposes of simplicity, and further, since they are not necessary to the showing of this invention, the electrical circuits and elements for use with the image scanning tube 26 are not shown.

It will be appreciated that in the average television camera these elements may comprise such elements as amplifying means and a relaxation wave generator for deflection purposes and the like. Also, the energizing means for the tube 26 per se are not shown since these means are not necessary to show the inventive concept in this application, and such energizing means are well known in the art. While a television camera has been illustrated, it should be borne in mind that this invention is in no wise limited to a television camera, but is equally adaptable for ordinary types of cameras, such as those for taking pictures, portrait cameras, and the like.

The housing 13 containing the lens 11 has fastened thereto a rack arrangement 30 which passes between guide rollers 31 and 32, and 33 and 34, and the lens is pushed forward or retracted by the action of pinion gear 36 which may be driven by a suitable driving means which, for the purposes of simplicity, is not shown since such means are well known. One form of such means is shown in Patent No. 2,162,908, issued June 20, 1939. A turning of the pinion, however, either advances or retracts the housing 13. The housing or hood 13 has a cam like slot 40 cut therein which engages a roller 41 mounted on roll member 42, the roll member being held between guide rollers 43, 44, 45 and 46. A slot 50, similar to the slot 40 in hood 13, is cut in the housing 17 containing the view finding lens 15 and engages a roller 51 fastened to the roll member 42. Thus, a similar synchronized motion is imparted to the hood 17 when the hood 13 is moved by the movement of the pinion gear on the rack 30. The slots 40 and 50 are shaped such as to keep the two lens systems, viz., the view finding and the camera lens, focussed for the same scene, though the lenses may have differing focal lengths and may be positioned appreciably different distances from the scene to be viewed.

The lens 15 is mounted in a holder which is slidably adjustable vertically in the slot 60 of the hood 17. Pivotally fastened to the mounting for the lens 15 is a lever arm 61 having between the extremities thereof another lever arm 62 pivotally fastened thereto and also pivotally fastened to the hood 17 at the point 63. At the extremity of the arm 61, remote from the point of fastening to the mount for the lens 15, is pivotally fastened a third lever arm 65 which has one extremity thereof held in pivotal relationship to the arm 61 at the point 66, and the other extremity thereof pivotally co-operating with arm 42 at the position 67.

The action of the device comprising the three lever arms immediately hereinbefore mentioned is as follows. When the hood 13 is moved either forwardly or backwardly by the action of the pinion 36 on the rack 30, the arm 42 is forced either upwardly or downwardly in accordance with the direction in which the hood or housing is moved. Assuming that the arm lever 42 is pushed upwardly, the arm 65 will then be pushed upwardly, and in view of the fact that the arm 61 is pivotally supported at a point intermediate its ends by the arm 62, the extremity of the arm 61 which is fastened to the mount for the lens 15 will be forced downwardly, thus bringing the position of that lens downwardly so that a nearby scene will be more correctly viewed by the observer, and hence the observable effect of parallax between the lenses 11 and 15 is minimized.

Accordingly, it will be seen that the arrangement as disclosed in the present disclosure is such that lenses of differing focal length may be used in the view finder and in the camera, and, furthermore, that the view finding screen and the camera screen need not be co-planarly related in order to provide an accurate view finding arrangement. In addition, the observable effect of parallax is not only minimized simply, but the parallax correction apparatus is made to operate from the action of the arrangement for correlating the action of the view finding and camera lenses.

Since both the parallax reducing means and the relative movement of both of the optical systems utilized in conjunction with the light sensitive screen and the viewing screen depends for their movement on the slots 40 and 50, these slots should be accurately formed. The design of the slots will be a relative matter depending on the relative sizes and focal lengths of the lens systems 11 and 15. Accordingly, it will be seen that these slots may vary with different cameras since the camera lens system 11 and the view finding lens system 15 may not necessarily be the same in each case, nor even relatively the same. It will be understood that the reference to a lens system in this specification does not necessarily include the use of a plurality of lenses since the term "lens system" is used generically to indicate either a single lens or a plurality of lenses.

It will be appreciated that there may be departures from the particular showings of this disclosure without departing from the spirit and scope of the invention, and accordingly I claim all such departures which fall fairly within the spirit and scope of the invention as defined in the hereinafter appended claims.

What I claim is:

1. In a camera, a view finding lens system, a housing slidable in the direction of the optical axis of said lens system containing and supporting said lens system, a camera lens system, a second housing containing and supporting said camera lens system and being slidable in a direction parallel to said first named housing, a cam slot of predetermined configuration formed in a member rigidly associated with said first named housing, a second cam slot formed in a member rigidly associated with said second named housing, movable cam follower means positioned to co-operate with each of said cam slots to impart movement to said housings, means operatively connecting all of said cam follower means, and means for driving one of said housings, said cam slots and said cam follower means imparting proportional motion simultaneously to said other housing.

2. In a camera, a view finding lens system, a housing slidable in the direction of the optical axis of said lens system containing and supporting said lens system, a camera lens system, a second housing containing and supporting said camera lens system and being slidable in a direction parallel to said first named housing, a cam slot of predetermined configuration formed in a member rigidly associated with said first named housing, a second cam slot formed in a member rigidly associated with said second named housing, a pair of cam followers, one for each of said slots to impart movement to said first named housing, a member capable of rectilinear movement carrying said followers in spaced relationship, and means for moving one of said housings, the follower associated therewith moving said member to in turn impart proportional movement to the other of said housings.

3. In a camera, a view finding lens system, a housing slidable in the direction of the optical axis of said lens system containing and supporting said lens system, a camera lens system, a second housing containing and supporting said camera lens system and being slidable in a direction parallel to said first named housing, a cam slot of predetermined configuration formed in a member rigidly associated with said first named housing, a second cam slot formed in a member rigidly associated with said second named housing, movable cam follower means positioned to co-operate with each of said cam slots to impart movement to said first named housing, means operatively connecting all of said cam follower means comprising a lever arm, a pivoted link connected to said lever arm and to a lens element of one of said optical systems whereby movement of said lever arm moves said lens element in a direction substantially normal to its optical axis, and means for driving one of said housings, said cam slots and said cam follower means imparting proportional motion simultaneously to said other housing.

ALDA V. BEDFORD.